United States Patent
Mukherjee et al.

(10) Patent No.: US 10,915,508 B2
(45) Date of Patent: Feb. 9, 2021

(54) DATA LINKING

(71) Applicant: GLOBAL IDS, INC., Princeton, NJ (US)

(72) Inventors: Arka Mukherjee, Princeton, NJ (US); Arka Sarkar, Kolkata, IN (US); William Presley Winkler, Dallas, TX (US)

(73) Assignee: GLOBAL IDS, INC., Princeton, NJ (US)

( * ) Notice: Subject to any disclaimer, the term of this patent is extended or adjusted under 35 U.S.C. 154(b) by 196 days.

(21) Appl. No.: 15/628,340

(22) Filed: Jun. 20, 2017

(65) Prior Publication Data

US 2018/0004833 A1    Jan. 4, 2018

Related U.S. Application Data

(60) Provisional application No. 62/356,928, filed on Jun. 30, 2016.

(51) Int. Cl.
*G06F 16/00* (2019.01)
*G06F 16/21* (2019.01)
*G06F 16/22* (2019.01)
*G06F 16/24* (2019.01)
*G06F 16/26* (2019.01)
*G06F 16/248* (2019.01)
(Continued)

(52) U.S. Cl.
CPC .......... *G06F 16/213* (2019.01); *G06F 16/214* (2019.01); *G06F 16/22* (2019.01); *G06F 16/221* (2019.01); *G06F 16/2282* (2019.01); *G06F 16/24* (2019.01); *G06F 16/248* (2019.01); *G06F 16/26* (2019.01); *G06F 16/283* (2019.01); *G06F 16/287* (2019.01); *G06F 16/9566* (2019.01)

(58) Field of Classification Search
CPC ...... G06F 16/213; G06F 16/22; G06F 16/221; G06F 16/287
USPC .................................................. 707/705, 706
See application file for complete search history.

(56) References Cited

U.S. PATENT DOCUMENTS 6,343,295 B1 * 1/2002 MacLeod .............. G06F 16/219
6,434,558 B1   8/2002 MacLeod
6,643,652 B2 * 11/2003 Helgeson .............. G06F 16/258
(Continued)

OTHER PUBLICATIONS

Reisser et al., "Utilizing Semantic Web Technologies for Efficient Data Lineage and Impact Analyses in Data Warehouse Environments", 20th International Workshop on Database and Expert Systems Application, IEEE Computer Society, 2009, pp. 59-63.

*Primary Examiner* — Mark E Hershley
(74) *Attorney, Agent, or Firm* — Mannava & Kang, P.C.; Vinay Malik (57) ABSTRACT

According to an example of the present disclosure, a system and a computer-implemented method of linking data in one or more databases are disclosed. The method includes selecting at least one domain based on a user input, where the domain is indicative of a class of data elements. Further, the method includes generating a plurality of uniform identifiers, based on the at least one domain and the one or more databases, where each of the plurality of uniform identifiers corresponds to an instance of the at least one domain. The method further includes correlating the plurality of uniform identifiers to link the instances corresponding to the plurality of uniform identifiers for linking the data stored in one or more databases.

20 Claims, 4 Drawing Sheets

(51) Int. Cl.
*G06F 16/28* (2019.01)
*G06F 16/955* (2019.01)

(56) References Cited

U.S. PATENT DOCUMENTS

| | | | | |
|---|---|---|---|---|
| 6,721,747 | B2* | 4/2004 | Lipkin | G06F 16/9535 |
| | | | | 709/209 |
| 6,823,379 | B1* | 11/2004 | Heckel | G06F 16/9566 |
| | | | | 709/224 |
| 6,999,964 | B2* | 2/2006 | Graser | G06F 9/465 |
| 7,089,583 | B2* | 8/2006 | Mehra | G06F 9/4488 |
| | | | | 726/3 |
| 7,725,433 | B1* | 5/2010 | Labrie | G06F 16/213 |
| | | | | 707/612 |
| 8,578,329 | B1* | 11/2013 | Chiluvuri | G06F 8/36 |
| | | | | 717/106 |
| 9,384,231 | B2* | 7/2016 | Benjamin | G06F 16/2365 |
| 9,659,042 | B2* | 5/2017 | Puri | G06F 16/35 |
| 9,767,100 | B2* | 9/2017 | Bator | G06F 16/40 |
| 2003/0172075 | A1* | 9/2003 | Reisman | G06F 16/951 |
| 2005/0015377 | A1* | 1/2005 | Wan | G06F 16/254 |
| 2005/0165865 | A1* | 7/2005 | Farmer | G06F 11/1471 |
| 2005/0289560 | A1* | 12/2005 | Sedogbo | G06F 8/38 |
| | | | | 719/328 |
| 2008/0120129 | A1* | 5/2008 | Seubert | G06Q 10/10 |
| | | | | 705/35 |
| 2009/0030880 | A1 | 1/2009 | Melamed | |
| 2009/0070103 | A1* | 3/2009 | Beggelman | G06F 40/20 |
| | | | | 704/9 |
| 2010/0011337 | A1* | 1/2010 | Young | G06F 8/20 |
| | | | | 717/104 |
| 2010/0138420 | A1* | 6/2010 | Bator | G06F 16/40 |
| | | | | 707/737 |
| 2011/0066602 | A1 | 3/2011 | Studer | |
| 2012/0191703 | A1 | 7/2012 | Huff | |
| 2013/0006968 | A1 | 1/2013 | Gusmini | |
| 2013/0095864 | A1* | 4/2013 | Marovets | H04L 51/08 |
| | | | | 455/466 |
| 2013/0332423 | A1 | 12/2013 | Puri | |
| 2014/0114907 | A1 | 4/2014 | Kozina | |
| 2014/0122452 | A1* | 5/2014 | Faerber | G06F 16/221 |
| | | | | 707/693 |
| 2014/0129942 | A1* | 5/2014 | Rathod | H04N 21/44222 |
| | | | | 715/720 |
| 2014/0280952 | A1* | 9/2014 | Shear | H04L 63/10 |
| | | | | 709/226 |
| 2014/0337816 | A1* | 11/2014 | Chiluvuri | G06F 8/36 |
| | | | | 717/107 |
| 2014/0358829 | A1 | 12/2014 | Hurwitz | |
| 2014/0379665 | A1 | 12/2014 | Benjamin | |
| 2015/0356123 | A1 | 12/2015 | Gorelik | |
| 2016/0034305 | A1* | 2/2016 | Shear | G06F 16/248 |
| | | | | 707/722 |
| 2016/0055184 | A1* | 2/2016 | Fokoue-Nkoutche | |
| | | | | G06F 16/213 |
| | | | | 707/809 |
| 2016/0085752 | A1 | 3/2016 | Von Weihe | |
| 2016/0098390 | A1 | 4/2016 | Kitajima | |
| 2016/0255139 | A1* | 9/2016 | Rathod | H04L 51/046 |
| | | | | 709/203 |
| 2016/0364434 | A1 | 12/2016 | Spitz | |
| 2017/0154087 | A1 | 6/2017 | McClure | |
| 2018/0004833 | A1* | 1/2018 | Mukherjee | G06F 16/248 |
| 2018/0052878 | A1* | 2/2018 | Seetharaman | G06F 40/30 |
| 2018/0089291 | A1 | 3/2018 | Vankamamidi | |
| 2018/0157702 | A1* | 6/2018 | Clemens | G06F 16/83 |
| 2018/0240273 | A1 | 8/2018 | Gordon | |

* cited by examiner

DATA LINKING

CROSS-REFERENCE TO RELATED APPLICATIONS

This application claims priority from U.S. Provisional Application No. 62/356,928, filed on Jun. 30, 2016 and is related to a co-pending application titled "DATA LINEAGE ANALYSIS" filed on even date herewith, each of which is incorporated herein by reference.

TECHNICAL FIELD

The present disclosure relates to data processing. More particularly, the present disclosure relates to linking data across databases.

BACKGROUND

Data in an enterprise can be in various systems. For example, different organization functions may have different database systems to store and manage data. This will result in data silos. Data in different silos may need to be linked for various uses. But context is required to understand how data in one silo might be reused in a different application context. Data dictionaries and ontologies may aim at providing context, but developing and maintaining definitions of all data in an enterprise is time consuming and involves significant manual effort. One of the key challenges is coordination between consultants to ensure that data elements representing the same business concepts carry the same definitions across databases. While domain classification may be used to define context, but it does not fully capture the context. For example, knowing the definition of a country code and the places where country codes exist across a data landscape may be useful. But this does not explain the purpose the country codes serve in each place they exist. Therefore, required context information may not be derived using existing methods and without proper context data may not be meaningfully linked across systems.

SUMMARY

According to an example of the present disclosure, a computer-implemented method of linking data stored in one or more databases is disclosed. The method includes selecting at least one domain based on a user input, where the domain is indicative of a class of data elements. Further, the method includes generating a plurality of uniform identifiers, based on the at least one domain and the one or more databases, where each of the plurality of uniform identifiers corresponds to an instance of the at least one domain. The method further includes correlating the plurality of uniform identifiers to link the instances corresponding to the plurality of uniform identifiers for linking the data stored in one or more databases.

According to another embodiment of the present disclosure, a system for linking data in one or more databases is disclosed. The system includes a processor and an indexer coupled to the processor. The indexer is configured to select at least one domain based on a user input, where the domain is indicative of a class of data elements. Further, the indexer is configured to generate a plurality of uniform identifiers based on the at least one domain and the one or more databases, where each of the plurality of uniform identifiers corresponds to an instance of the at least one domain. The indexer is further configured to correlate the plurality of uniform identifiers to link the instances corresponding to the plurality of uniform identifiers for linking the data stored in one or more databases.

According to yet another embodiment of the present disclosure, a non-transitory computer-readable medium is disclosed. The non-transitory computer-readable medium includes instructions that, when executed by a processor, cause the processor to perform a method of linking data in one or more databases. The method includes selecting at least one domain based on a user input, where the domain is indicative of a class of data elements. Further, the method may include, generating a plurality of uniform identifiers, based on the at least one domain and the one or more databases, where each of the plurality of uniform identifiers corresponds to an instance of the at least one domain. The method may further include, correlating the plurality of uniform identifiers to link the instances corresponding to the plurality of uniform identifiers for linking the data stored in one or more databases.

BRIEF DESCRIPTION OF THE DRAWINGS

Embodiments and examples are described in detail in the following description with reference to the following figures. The embodiments are illustrated by examples shown in the accompanying figures in which like reference numerals indicate similar elements.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description. Furthermore, the embodiments and examples may be used together in various combinations.

The present disclosure relates to a computer-implemented method and a system of linking data across databases. According to an embodiment of the present disclosure, at least one domain is selected and instances corresponding to the at least one domain are identified across the databases. The domain may be indicative of a class of data elements of an object. The instances serve as natural key and a combination of two domains serve as a unique combination specific to the object. Based on the instances or natural keys, uniform identifiers may be generated. The uniform identifiers may be may subsequently be correlated for linking the instances, thereby linking the data across the databases.

In an example, the data to be linked may be classified and/or profiled prior to being linked. During classification and profiling, a domain, for example, "person name", may be divided into a plurality of constituent domains, for example, "first name" and "last name". sub-domains. For instance, a domain name may be divided into sub-domains first name and last name. The sub-domains may interchangeably be referred to as constituent domains. Classification and profiling of the data reduces the probability of an instance corresponding to the domain being missed during linking of the data. Further, for linking the data, semantic web technology may be used, in an example. Using such a data linking technique allows for capturing schema related information and thus provides context to the linked data. As a result, the data may be used for other applications and analytics based on the data may be performed with increased accuracy.

Figure 1:
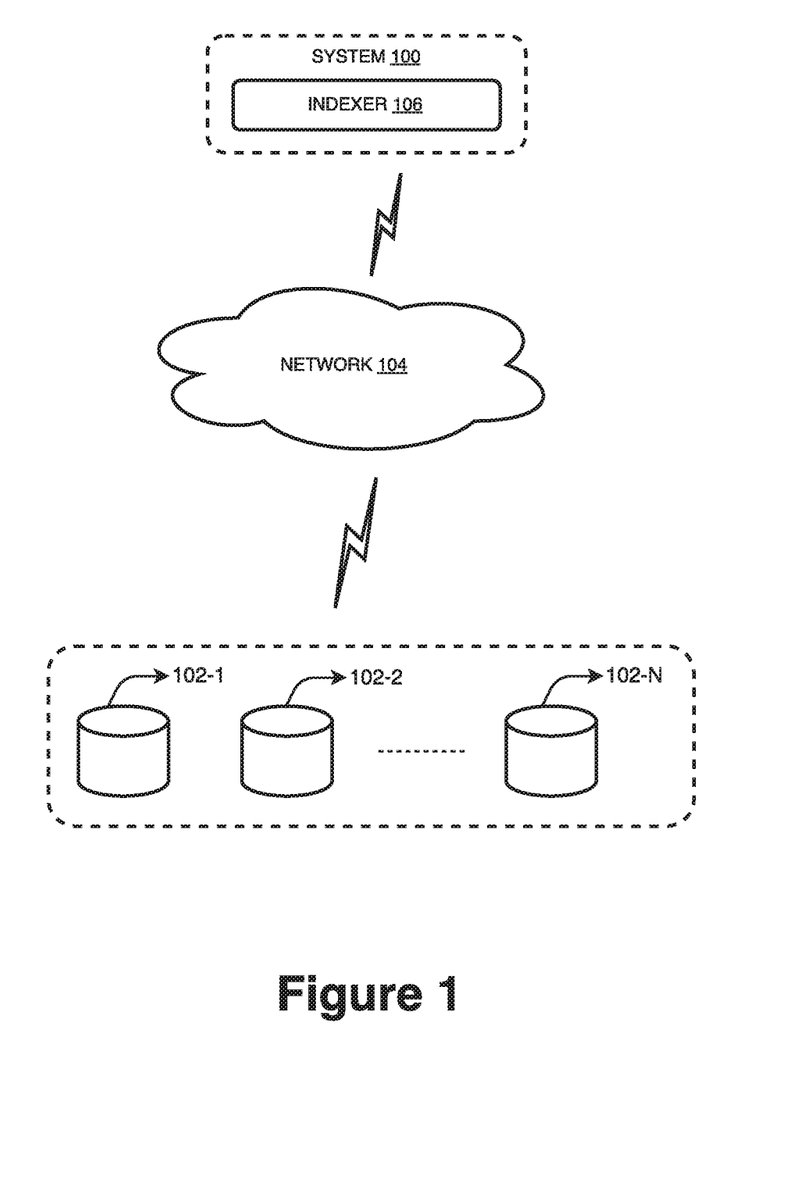
FIG. 1 illustrates a block diagram of a computer system for linking data in one or more databases, according to one embodiment of the present disclosure.

FIG. 1 illustrates a block diagram of a system 100 for linking data stored in one or more databases 102-1, 102-2, 102-N, according an embodiment of the present disclosure. The system 102 may include one or more computing devices, such as a mainframe computer, a personal computer, a laptop, a desktop, a workstation computer, a server, a cloud server, and the like. Further, in an embodiment, the system 100 may be a distributed or centralized network system in which different computing devices may host one or more of the hardware or software components of the system 100. The databases 102-1 to 102-N, in an example, may be implemented by an enterprise for storing data relating to customers and enterprise operations.

In an example, the system 102 may be connected to the databases 102-1 to 102-N through a network 104. The network 104 may be a wireless network, a wired network, or a combination thereof. The network 104 can also be an individual network or a collection of many such individual networks, interconnected with each other and functioning as a single large network, e.g., the Internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 104 may include network devices, such as network switches, hubs, routers, for providing a link between the system 100 and the databases 102-1 to 102-N. The network devices within the network 104 may interact with the system 100 and the databases 102-1 to 102-N through communication links.

In an example, a user, such as an ontologist or an administrator, may seek to link the data present in the databases 102-1 to 102-N. As mentioned above, the data may include information relating to customers and enterprise operations. Linking of the data with proper context may facilitate the performance of analytics about customers and enterprise operations. Prior to the linking of the data, profiling and classification of the data stored in the databases 102-1 to 102-N may be performed, for example, using a parsing technique. As a result, a domain present in a database may be divided into constituent domains. The domain, as used herein, may be indicative of a class of data elements. For instance, a domain "customer name" may represent a class of data elements indicating customer names. Upon parsing, the domain "customer name" may be divided into constituent domains "first name" and "last name".

In an embodiment, the system 100 includes an indexer 106 for linking the data stored in the databases 102-1 to 102-N. The indexer 106, in an example, may be implemented by at least one processing device (shown in FIG. 3). Continuing with the present embodiment, the indexer 106 may select at least one domain based on a user input. For instance, the ontologist or the administrator, for indexing data about customers, may provide the user input indicating domains last name and phone number. Based on the user input, the indexer 106 selects the domains last name and phone number. As may be understood, instances of the aforementioned domains may be present throughout the databases 102-1 to 102-N. Based on the selected domains and the databases 102-1 to 102-N, the indexer 106 may generate a plurality of uniform identifiers. Each of the plurality of uniform identifiers may correspond to an instance of the selected domains. Subsequently, in an embodiment, the indexer 106 may correlate the plurality of uniform identifiers to link the instances corresponding thereto, thereby linking the data in the databases 102-1 to 102-N. In an example, the indexer 106 may use a data linking technique, such as a semantic web technique, for correlating the instances based on the plurality of uniform identifiers.

Figure 2:
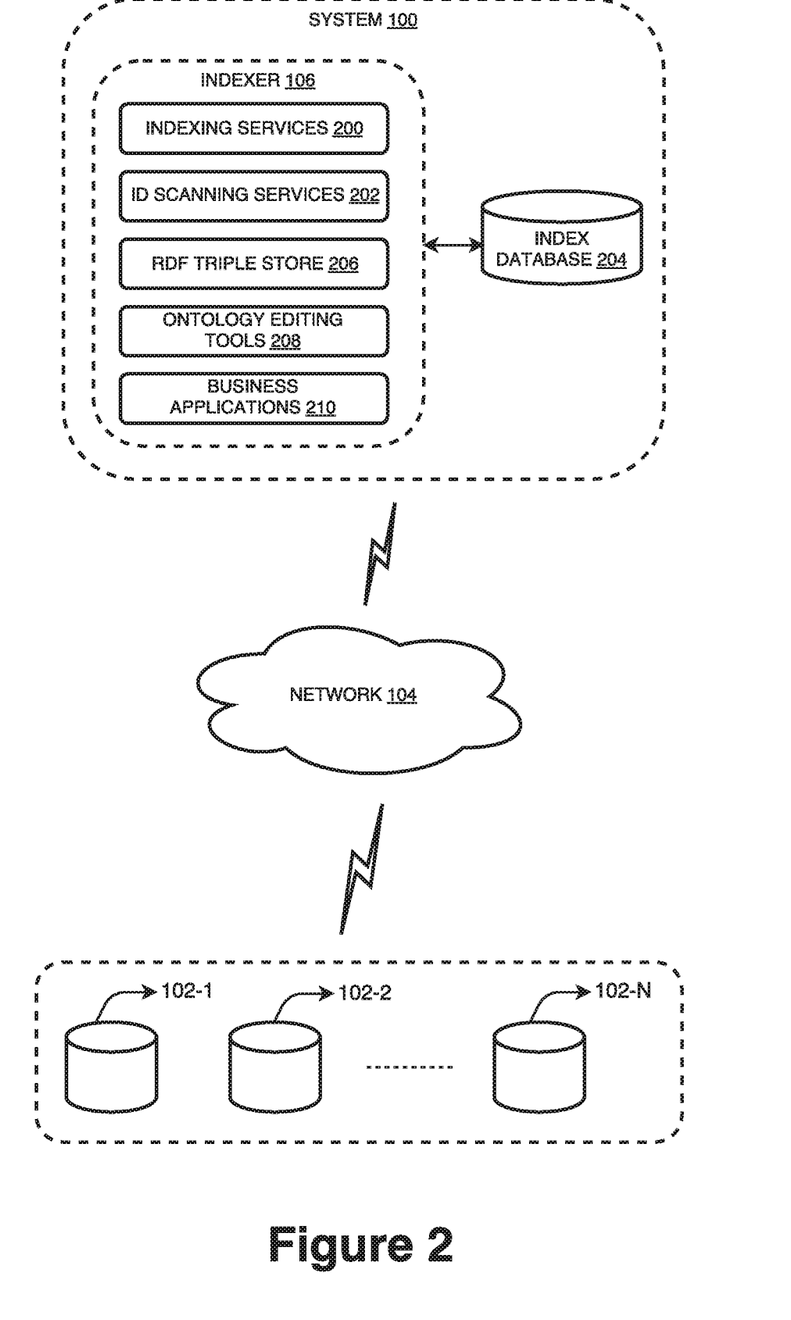
FIG. 2 illustrates a detailed block diagram of a computer system for linking data in one or more databases, according to one embodiment of the present disclosure.

FIG. 2 illustrates a detailed block diagram of the system 100 for linking the data in the databases 102-1 to 102-N. The system 100, in an example, may include the indexer 106 and an index database 204. The indexer 106, in an example, may include indexing services 200, identifier (ID) scanning services 202, Resource Description Framework (RDF) triple store 206, ontology editing tools 208, and business applications 210. Further, the system 100 may include a User Interface and an Application Programming Interface (not shown in the FIG. 2). As described earlier with reference to the description of FIG. 1, the system 100 may classify and profile the data prior to linking of the data. After the classification and profiling, in an example, domain graph instances may be generated and stored in the databases 102-1 to 102-N. Each node of the domain graph may indicate an instance of a domain or a constituent domain and the nodes may be interconnected through connections indicating the relation between nodes in a given schema. For instance, a node in the graph might represent an individual, say, "fred" pertaining to a domain "person. Another node might represent an instance, say "smartphone" of a domain "product order". There might be a link between the two nodes representing an "ordered by" relationship.

In an embodiment, the ontologist or the administrator may provide the user input through the user interface for selecting of the domains. On receiving the input, the indexing services 200 may select the domains and may subsequently generate an identifier specification based on the selected domains. The identifier specification may be indicative of information related to the domains, for example, name of the domains, and a type of identifier which may be generated based on the domains. For instance, an identifier specification of a phone number (NXX+LINE) and a last name of a person may include "NXX+LINE+LAST-NAME" where NXX, LINE, and LAST NAME are domains. The identifier specification may be mapped to an identifier type of "gid: person-id-v1". In an example, the indexing services 200 may link the identifier specification with one or more additional identifiers (IDs). The additions IDs may include an application context ID and a context ID. The additional IDs facilitate in linking of the data and developing context between the data elements.

In an example, the ID scanning services 202 may receive the identifier specification as an input parameter for performing an indexing process. In the indexing process, the ID scanning services 202 may scan the data in the databases 102-1 to 102-N. In the scan, for each instance of the selected domains found in the databases 102-1 to 102-N, the ID scanning service 202 may generate a corresponding uniform identifier. In an example, the ID scanning service 202 may generate the uniform identifier by hashing the instance. In an example, the ID scanning service 202 may generate a uniform identifier for every distinct combination of the selected domains found in the domain graphs. For instance, for a person named "Alyssa Myers" and having phone number "972-867-5309", the ID scanning services 202 may identify distinct combination such as Alyssa Myers, Alyssa F Myers, Myers Alyssa F, A F Myers. In said example, the ID scanning services 202 identifies any domain graph instance containing a record about Alyssa Myers and an associated phone number of 972-867-5309, regardless of how these might be formatted locally, and generates a corresponding uniform identifier. The ID scanning services 202, in an example, stores the plurality of uniform identifiers in the index database 204.

In an embodiment, the ID scanning services 202 may implement probability techniques to identify the instances of the domains. For instance, the ID scanning services 202 may implement a time bound probability technique, such as Bayes equation, for identifying instances pertaining to the domains.

In an embodiment, the RDF triple store 206 may correlate the plurality of uniform identifiers generated above using a data linking technique, such as Semantic Web technique. As a result, the instances corresponding to the plurality of identifiers are linked, thereby linking the data in the databases 102-1 to 102-N. Additionally, schema based information related to instances is captured and as a result, relevant context is provided to the linked data. In an example, the linked or indexed data along with schema information and context may be stored in the index database 204.

In an embodiment, the ontology editing tools 208 may provide the ontologist or the administrator with access the index database 204 through a query language, such as SPARQL. Once the access is provided, the ontologist or the administrator may view the data, metadata, may define classes, define a link to other ontology, and the like.

In an embodiment, the UI may display or render the change data capture feeds to the ontologist. The change data capture may be understood as a technique to detect changes in database logs. Thus, in said embodiment, near real-time indexing of the data may be performed. In another embodiment, the administrator may develop the business applications 210 based on the linked data stored in the index database 204. The business applications 201 may include one or more applications configured to perform analysis based on the linked data. Owing to presence of context to the linked data, meaningful analysis may be performed.

Figure 3:
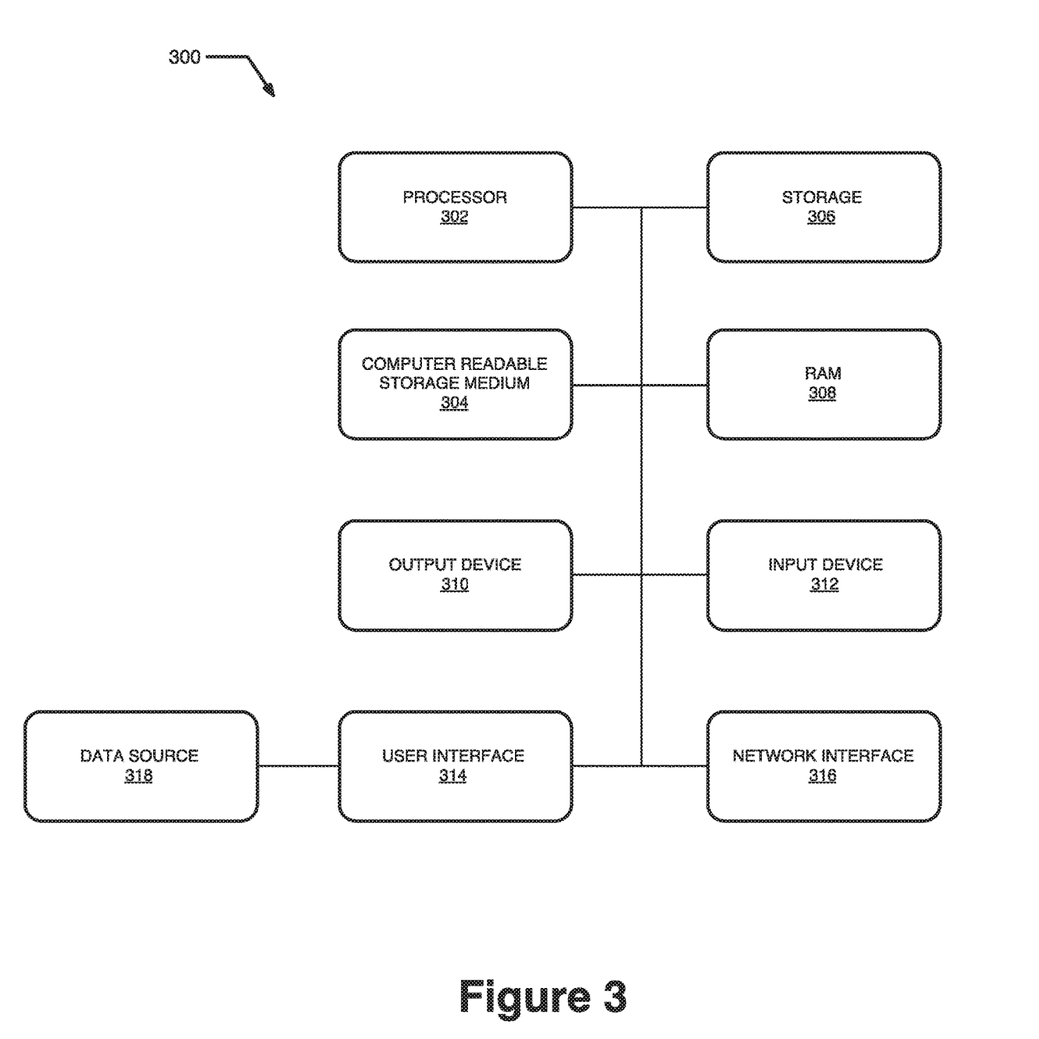
FIG. 3 illustrates a hardware platform for implementation of the computer system, according to one embodiment of the present disclosure.

FIG. 3 illustrates a hardware platform 300 for implementation of the system 100, according to one embodiment of the present disclosure. In one embodiment, the hardware platform 300 may be a computation system that may be used with the examples described herein. The computation system may represent a computational platform that includes components that may be in a server or another computer system. The computation system may execute, by a processor 302 (e.g., a single or multiple processors) or other hardware processing circuit, the methods, functions and other processes described herein. These methods, functions and other processes may be embodied as machine readable instructions stored on a computer readable storage medium 304, which may be non-transitory, such as hardware storage devices, for example, Random Access Memory (RAM), Read Only Memory (ROM), Erasable Programmable ROM (EPROM), Electrically Erasable Programmable ROM (EEPROM), hard drives, and flash memory.

The computation system may include the processor 302 that may implement or execute machine readable instructions performing some or all of the methods, functions, techniques and/or other processes described herein. Commands and data from the processor 302 may be communicated over a communication bus (not shown). The computation system may also include a main memory 308, such as a random access memory (RAM), where the machine readable instructions and data for the processor 302 may reside during runtime, and a storage 306, which may be non-volatile and stores machine readable instructions and data. The memory 308 and the storage 306 are examples of non-transitory computer readable mediums. The memory 308 and/or the secondary data storage may store data used by the computation system, such as an object repository including web objects, configuration data, test data, etc.

The computation system may include an input device 312, such as a keyboard and a mouse, and an output device 310. A user interface 316 can be a communication device that provides textual and graphical user interfaces to a user of the computation system. The user interface 316 may operate with the input device 312 and the output device 310 to accept from and provide data to a user, for example, from a data source 318. The computation system may include a network interface 314 for connecting to a network. Other known electronic components may be added or substituted in the computer system. The processor 302 may be designated as a hardware processor. The processor 302 may execute various components of the computation system described above and perform the methods described below.

Figure 4:
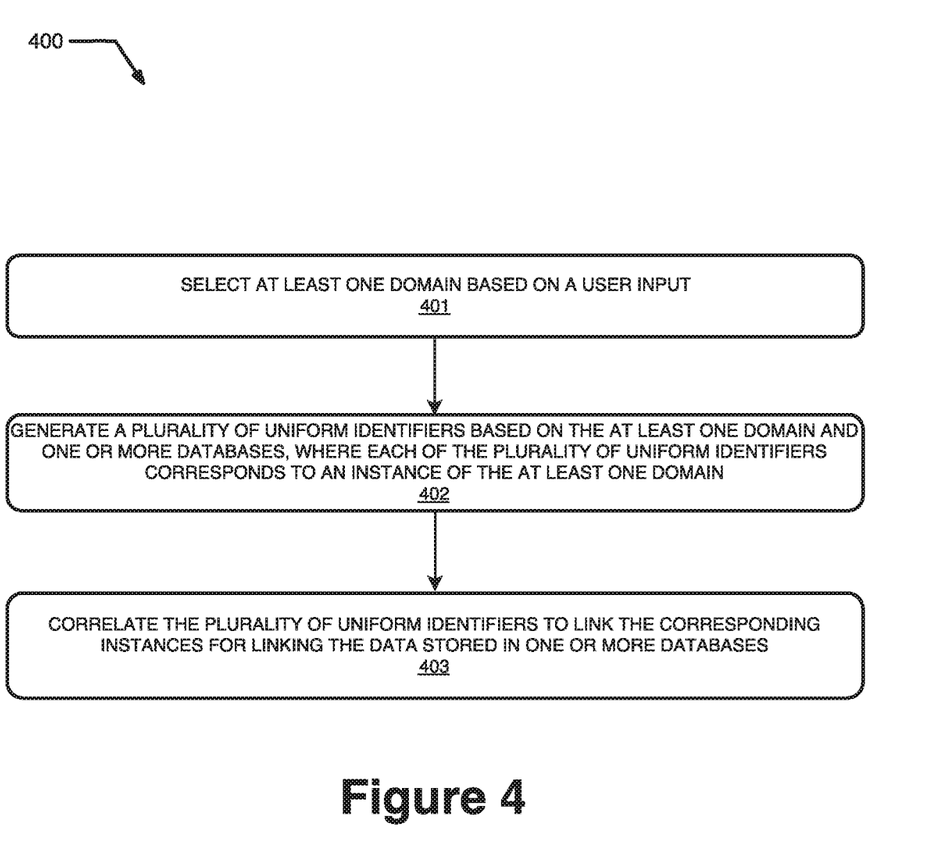
FIG. 4 illustrates a flow chart depicting a computer-implemented method of linking data in one or more databases, according to one embodiment of the present disclosure.

FIG. 4 illustrates a flow chart depicting a computer-implemented method 400 of linking data in one or more databases, according to one embodiment of the present disclosure. For the sake of brevity, construction and operational features of the system 100 which are explained in detail in the description of FIG. 1, FIG. 2, and FIG. 3 are not explained in detail in the description of FIG. 4.

Referring to FIG. 4, at step 401, at least one domain is selected based on a user input. The domain, as used herein, may be indicative of a class of data elements. In an example, the indexer 106 may select the domain based on the user input. As described in the description of FIG. 2, based on the at least one domain, an identifier specification may be generated.

At step 402, a plurality of uniform identifiers based on the at least one domain and one or more databases are generated. Each of the uniform identifiers corresponds to an instance of the domain. In an example, data in the databases 102-1 to 102-N may be scanned for identifying instances corresponding to the at least one domain. Each identified instance is subsequently hashed to generate a corresponding uniform identifier. In an example, the indexer 106 may generate the uniform identifiers.

At step 403, the plurality of uniform identifiers is correlated to link the corresponding instances for linking the data in the one or more databases. In an example, a data linking technique, such as Semantic web technique may be implemented for linking the uniform identifiers. For instance, a first uniform identifier and a second uniform identifier are selected. Subsequently, a resource description framework (RDF) triple is generated based on the first uniform identifier and the second uniform identifier for correlating the first uniform identifier with the second uniform identifier.

As a result of correlating the uniform identifiers, underlying schema information may be captured and context may be provided to the data stored in the databases 102-1 to 102-N. In an example, the indexer 106 may correlate the uniform identifiers.

In one embodiment, a non-transitory computer-readable medium may include instructions that, when executed by the processor also referred to as the at least one processing unit, cause the processor to perform the method 400 of linking the data in one or more databases 102-1 to 102-N. The method 400 may include selecting at least one domain based on a user input, wherein the domain is indicative of a class of data elements. Further, the method 400 may include, generating a plurality of uniform identifiers, based on the at least one domain and the one or more databases, wherein each of the plurality of uniform identifiers corresponds to an instance of the at least one domain. The method 400 may further include, correlating the plurality of uniform identifiers to link the instances corresponding to the plurality of uniform identifiers for linking the data stored in one or more databases.

Embodiments and examples are described above, and those skilled in the art will be able to make various modifications to the described embodiments and examples without departing from the scope of the embodiments and examples.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

What is claimed is:

1. A computer-implemented method of linking data stored in a plurality of databases, the method comprising:
    selecting at least one domain based on a user input, wherein the at least one domain is indicative of a class of data elements, the class being based on a context of a usage of the data elements in an application context corresponding to one or more applications and to provide for linking of the data elements of the data;
    generating a plurality of uniform identifiers, based on the at least one domain and the plurality of databases, wherein each of the plurality of uniform identifiers is generated for an instance of the at least one domain in the plurality of databases, and wherein the instance is identified by scanning the data in the plurality of databases, using an identifier specification linked to the application context and wherein the instance is indicative of a data value of a data element of the data, and wherein a uniform identifier is generated for each distinct combination of the at least one domain in a domain graph; and
    correlating the plurality of uniform identifiers to link each instance corresponding to the plurality of uniform identifiers for linking the data stored in the plurality of databases.

2. The computer-implemented method of claim 1, wherein the generating comprises:
    identifying the instance of the at least one domain in a database from among the plurality of databases; and
    generating the uniform identifier based on the instance.

3. The computer-implemented method of claim 1, wherein the correlating comprises:
    selecting a first uniform identifier from the plurality of uniform identifiers;
    selecting a second uniform identifier from the plurality of uniform identifiers; and
    generating a resource description framework (RDF) triple based on the first uniform identifier and the second uniform identifier for correlating the first uniform identifier with the second uniform identifier.

4. The computer-implemented method of claim 1, wherein the at least one domain is a constituent domain.

5. The computer-implemented method of claim 1, wherein the plurality of uniform identifiers are correlated based on a semantic web technology.

6. The computer-implemented method of claim 1, wherein the identifier specification is indicative of an information related to the at least one domain selected based on the user input, and wherein the identifier specification is linked to at least one of: an application context identifier identifying the application context and a context identifier identifying the context.

7. The computer-implemented method of claim 6, further comprising:
    facilitating linking of the data by using the application context identifier and the context identifier; and
    developing the context among the data elements using the application context identifier and the context identifier.

8. The computer-implemented method of claim 1, wherein each unique identifier of the plurality of unique identifiers is generated based on hashing of the instance respectively, of the at least one domain in the plurality of databases.

9. The computer-implemented method of claim 1, wherein a first domain is indicative of a first class of a first set of data elements corresponding to a first application context and a second domain is indicative of a second class of a second set of data elements corresponding to a second set of data elements corresponding to a second application context, and wherein the first application context is different from the second application context.

10. The computer-implemented method of claim 1, wherein the one or more applications access the data from the plurality of databases based on the application context, and wherein accessing the data comprises accessing a set of data elements relevant for the application context.

11. A system for linking data stored in a plurality of databases, the system comprising:
    a processor; and
    an indexer coupled to the processor to,
    select at least one domain based on a user input, wherein the at least one domain is indicative of a class of data elements, the class being based on context of a usage the data elements in an application context corresponding to one or more applications and to provide for linking of the data elements of the data;
    generate a plurality of uniform identifiers based on the at least one domain and the plurality of databases, wherein each of the plurality of uniform identifiers is generated for an instance of the at least one domain in the plurality of databases, and wherein the instance is identified by scanning the data in the plurality of databases using an identifier specification linked to the application context and wherein the instance is indicative of a data value of a data element of the data, and wherein a uniform identifier is generated for each distinct combination of the at least one domain in a domain graph; and correlate the plurality of uniform identifiers to link each instance corresponding to the plurality of uniform identifiers for linking the data stored in the plurality of databases.

12. The system of claim 11, wherein the indexer further is to, identify the instance of the at least one domain in a database from among the plurality of databases; and generate a uniform identifier based on the instance.

13. The system of claim 11, wherein the indexer further is to, select a first uniform identifier from the plurality of uniform identifiers;

select a second uniform identifier from the plurality of uniform identifiers; and generate a resource description framework (RDF) triple based on the first uniform identifier and the second uniform identifier for correlating the first uniform identifier with the second uniform identifier.

14. The system of claim 11, wherein the at least one domain is a constituent domain.

15. The system of claim 11, wherein the plurality of uniform identifiers is correlated based on a semantic web technology.

16. A non-transitory computer-readable medium comprising: instructions that, when executed by a processor, cause the processor to perform a method of linking data stored in a plurality of databases, the method comprising:

selecting at least one domain based on a user input, wherein the at least one domain is indicative of a class of data elements, the class being based on a context of a usage of the data elements in an application context corresponding to one or more applications and to provide for linking of the data elements of the data;

generating a plurality of uniform identifiers, based on the at least one domain and the plurality of databases, wherein each of the plurality of uniform identifiers is generated for an instance of the at least one domain in the plurality of databases, wherein the instance is identified by scanning the data in the plurality of databases using an identifier specification linked to the application context and wherein the instance is indicative a data value of a data element of the data, and wherein a uniform identifier is generated for each distinct combination of the at least one domain in a domain graph; and correlating the plurality of uniform identifiers to link each instance corresponding to the plurality of uniform identifiers for linking the data stored in the plurality of databases.

17. The non-transitory computer-readable medium of claim 16, wherein the processor further is to, identify the instance of the at least one domain in a database from among the plurality of databases; and generate a uniform identifier based on the instance.

18. The non-transitory computer-readable medium of claim 16, wherein the processor further is to, select a first uniform identifier from the plurality of uniform identifiers;

select a second uniform identifier from the plurality of uniform identifiers; and generate a resource description framework (RDF) triple based on the first uniform identifier and the second uniform identifier for correlating the first uniform identifier with the second uniform identifier.

19. The non-transitory computer-readable medium of claim 16, wherein the at least one domain is a constituent domain.

20. The non-transitory computer-readable medium of claim 16, wherein the plurality of uniform identifiers is correlated based on a semantic web technology.

* * * * *